US008996575B2

(12) United States Patent
Laitkorpi et al.

(10) Patent No.: US 8,996,575 B2
(45) Date of Patent: Mar. 31, 2015

(54) METHOD, AN APPARATUS, A COMPUTER SYSTEM, A SECURITY COMPONENT AND A COMPUTER READABLE MEDIUM FOR DEFINING ACCESS RIGHTS IN METADATA-BASED FILE ARRANGEMENT

(75) Inventors: Markku Laitkorpi, Tampere (FI); Antti Nivala, Pirkkala (FI); Juha Lepola, Tampere (FI); Ari Metsäpelto, Sastamala (FI); Timo Partanen, Lempäälä (FI)

(73) Assignee: M-Files Oy, Tampere (FI)

( * ) Notice: Subject to any disclaimer, the term of this patent is extended or adjusted under 35 U.S.C. 154(b) by 582 days.

(21) Appl. No.: 12/924,625

(22) Filed: Sep. 29, 2010

(65) Prior Publication Data

US 2012/0078965 A1  Mar. 29, 2012

(51) Int. Cl.
*G06F 7/00* (2006.01)
*G06F 17/30* (2006.01)
*G06F 21/62* (2013.01)

(52) U.S. Cl.
CPC .... *G06F 21/6218* (2013.01); *G06F 2221/2145* (2013.01)
USPC ...................................................... 707/785

(58) Field of Classification Search
CPC ................... G06F 17/30091; G06F 17/30165; G06F 17/3028
USPC .......................................................... 707/785
See application file for complete search history.

(56) References Cited

U.S. PATENT DOCUMENTS

| 6,892,201 | B2 * | 5/2005 | Brown et al. ........................... 1/1 |
| 7,860,589 | B2 * | 12/2010 | Bliss et al. ...................... 700/86 |
| 7,921,299 | B1 * | 4/2011 | Anantha et al. ............... 713/187 |
| 2002/0088000 | A1 | 7/2002 | Morris |
| 2003/0177248 | A1 * | 9/2003 | Brown et al. ................. 709/229 |
| 2004/0107125 | A1 * | 6/2004 | Guheen et al. .................... 705/7 |
| 2005/0289166 | A1 * | 12/2005 | Stanley et al. ............... 707/100 |
| 2006/0010483 | A1 * | 1/2006 | Buehler et al. .................... 726/1 |
| 2006/0178918 | A1 * | 8/2006 | Mikurak ........................... 705/7 |
| 2007/0061266 | A1 * | 3/2007 | Moore et al. ..................... 705/51 |
| 2007/0136603 | A1 * | 6/2007 | Kuecuekyan ................. 713/185 |
| 2007/0174031 | A1 * | 7/2007 | Levenshteyn et al. .......... 703/13 |
| 2007/0208440 | A1 * | 9/2007 | Bliss et al. ...................... 700/87 |
| 2007/0226807 | A1 * | 9/2007 | Ginter et al. .................... 726/27 |

(Continued)

OTHER PUBLICATIONS

Pierangela Samarati, et al; "Access control: Policies, Models, and Mechanisms;" Foundations of Security Analysis and Design; Sep. 18, 2000; vol. 2171, ; pp. 137-196.

*Primary Examiner* — Mark E Hershley
(74) *Attorney, Agent, or Firm* — Ware, Fressola, Maguire & Barber LLP

(57) ABSTRACT

The invention relates to a method for a computer system storing electronic objects being defined by metadata items. The method comprises deriving access rights from one or more security components originating from respective metadata items of at least one object, and determining the effective access rights for the object by means of the security components. The invention also relates to a method for a computer system storing electronic objects being defined by metadata items, wherein access rights for an object are determined by means of one or more pseudo-users. The invention also relates to an apparatus, a computer system and a computer readable medium comprising a computer program stored therein for carrying out the methods.

7 Claims, 9 Drawing Sheets

(56) References Cited

U.S. PATENT DOCUMENTS

| | | |
|---|---|---|
| 2008/0155652 A1* | 6/2008 | DeBie ............................... 726/2 |
| 2008/0215964 A1* | 9/2008 | Abrams et al. ................. 715/246 |
| 2008/0263640 A1* | 10/2008 | Brown .............................. 726/5 |
| 2009/0055890 A1* | 2/2009 | Anderson et al. ................. 726/1 |
| 2009/0240737 A1* | 9/2009 | Hardisty et al. ................ 707/200 |
| 2009/0254572 A1* | 10/2009 | Redlich et al. .................. 707/10 |
| 2009/0271412 A1* | 10/2009 | Lacapra et al. ................. 707/10 |
| 2011/0093471 A1* | 4/2011 | Brockway et al. ............ 707/747 |

* cited by examiner

METHOD, AN APPARATUS, A COMPUTER SYSTEM, A SECURITY COMPONENT AND A COMPUTER READABLE MEDIUM FOR DEFINING ACCESS RIGHTS IN METADATA-BASED FILE ARRANGEMENT

FIELD OF THE INVENTION

The present invention relates to defining access rights for objects in a computer system.

BACKGROUND OF THE INVENTION

In a computer system, an access control list (ACL) is a solution of a security model for giving permissions to users for accessing electronically stored object. An ACL specifies which users and/or user groups are authorized to access objects and which operations are allowed on given objects. The operations can include reading ("R") from an object, writing ("W") to an object, deleting ("D") an object, and executing ("X") an object. Traditionally the users are identified by their name, and the groups by their members.

In addition to name-based access control, there is a solution for a role-based access control. In such a system, the permission to perform a certain operation is assigned to a specific role rather than a name. This eases the maintenance work because ACL doesn't have to be updated every time a new user is added to a certain job function.

Aforementioned solutions are derived from so called traditional folder structure, where folders are located in a static folder hierarchy. Therefore also ACL's are limited to a single hierarchy of access rights. Similarly, access roles are often statically assigned from a predefined set of users of user groups.

However, these solutions are not suitable for metadata-based folder hierarchy, as in a dynamic document management system. This is because in the dynamic document management system, the objects are not statically located in the folder structure but their existence in the document space varies according to the circumstance. Therefore, a different kind of an ACL solution is needed for the requirements of the metadata-based document management system.

SUMMARY OF THE INVENTION

In the following an ACL solution for metadata-based file arrangement is disclosed. The solution approaches the problem from two points of view. At first, access control lists are dynamically formed by means of security components being referred via metadata items of the object. Secondly the solution introduces a model for defining ACL's by means of pseudo-users. This model can be utilized by the security component of the first solution as well.

Various aspects of the invention include two methods, an apparatus, a computer system, and two computer readable medium comprising a computer program stored therein, which are characterized by what is stated in the independent claims. Various embodiments of the invention are disclosed in the dependent claims.

According to a first aspect, a method for a computer system storing electronic objects being defined by metadata items, comprises deriving access rights from one or more security components originating from respective metadata items of at least one object, and determining the effective access rights for the object by means of the security components.

According to a second aspect, an apparatus comprises a processor, a memory including computer program code, the memory and the computer program code configured to, with the processor, cause the apparatus to perform at least the following: to store electronic objects being defined by metadata items, to derive access rights from one or more security components originating from respective metadata items of at least one object, and to determine the effective access rights for the object by means of the security components.

According to third aspect, a computer system comprises at least one processor, at least one memory including computer program code, the memory and the computer program code configured to, with said at least one processor, cause the computer system at least to perform: to store electronic objects being defined by metadata items, to derive access rights from one or more security components originating from respective metadata items of at least one object, and to determine the effective access rights for the object by means of the security components.

According to fourth aspect, a computer readable medium comprises computer program instructions stored thereon, wherein said instructions, when executed, are for storing electronic objects being defined by metadata items, for deriving access rights from one or more security components originating from respective metadata items of at least one object, and for determining the effective access rights for the object by means of the security components.

According to fifth aspect, a method for a computer system storing electronic objects being defined by metadata items, comprises determining access rights for an object by means of one or more pseudo-users.

According to sixth aspect, a computer readable medium comprising computer program instructions stored thereon, wherein said instructions, when executed, are for determining access rights for an object by means of one or more pseudo-users.

According to an embodiment, an object refers to the object's own access control list, wherein the effective access rights for said object are determined by means of security components as part of the object's own access control list.

According to second embodiment, a security component originates directly from the object's metadata item.

According to third embodiment, a security component originates indirectly from the object's metadata item.

According to fourth embodiment, the security component originates from a metadata item of more than one cascaded object.

According to fifth embodiment, the more than one security components are combined, wherein the effective access rights are determined as an intersection of the more than one security components.

According to sixth embodiment, more than one security components are combined, wherein the effective access rights are determined according to one of the following rules: one overrides the others, each supplements the effective access right, one restricts the others, one defines the maximum, one defines the minimum rights, or any combination of those.

According to sixth embodiment, access rights are defined by means of pseudo-users in said security component.

According to sixth embodiment, the persons being allowed to access the document are identified by resolving pseudo-users from the metadata items of the object.

According to seventh embodiment, the persons being allowed to access the document are identified by resolving pseudo-users from the metadata items of more than one cascaded object.

According to eighth embodiment, the computer system comprises a client and a server.

Other embodiments as well as advantages of present solutions are disclosed in the detailed description which follows the description of drawings.

DESCRIPTION OF THE DRAWINGS

In the following, various embodiments of the invention will be described in more detail with reference to the appended drawings, in which

FIG. 6b shows the effective access rights for the object of FIG. 6a.

DETAILED DESCRIPTION OF THE EMBODIMENTS

In the following, several embodiments of the invention will be described in the context of dynamic document management system. It is to be noticed, however, that the invention is not limited only to such a system. In fact, the different embodiments have applications widely in any metadata based environment (i.e. file arrangement), where security and access rights are expected.

Document Management System

In this context, the term document management system (DMS) refers to a file arrangement that stores objects that are defined by metadata (i.e. properties). Other terms that are typically used for document management system are content management system (CMS) and data management system. In the present disclosure the term "document management system" is a general term referring also to content and data management systems. Such systems comprise various features for managing electronic documents, e.g. storing, versioning, indexing, searching for and retrieval of documents. It is appreciated that there are both dynamic and static document management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The observed location of the files is not constant, but may vary in a virtual space depending on the situation.

Before describing the invention in a more detailed manner, a few terms are defined in order to ease the reading and understanding of the invention. In this disclosure, the term "document" relates to a medium (a file) that has been created by a certain application and that has been associated with metadata. For example, a piece of text created by using the Microsoft Word application is a file. "Metadata" refers to information on a document's properties. For example, a creator of the file or a creation date may represent the metadata. The term "object" refers to a document, and is composed of the content of the object as well as of the metadata of the object. Documents and other metadata defined objects are located statically or virtually in the file arrangement. Virtual location is defined by giving a document location(s) based on its metadata, which then addresses the document into a certain virtual folder depending on the route the document is approached. Therefore the content of each folder depends on the current property values of objects and may vary according to a use case and is thus dynamic.

Figure 1:
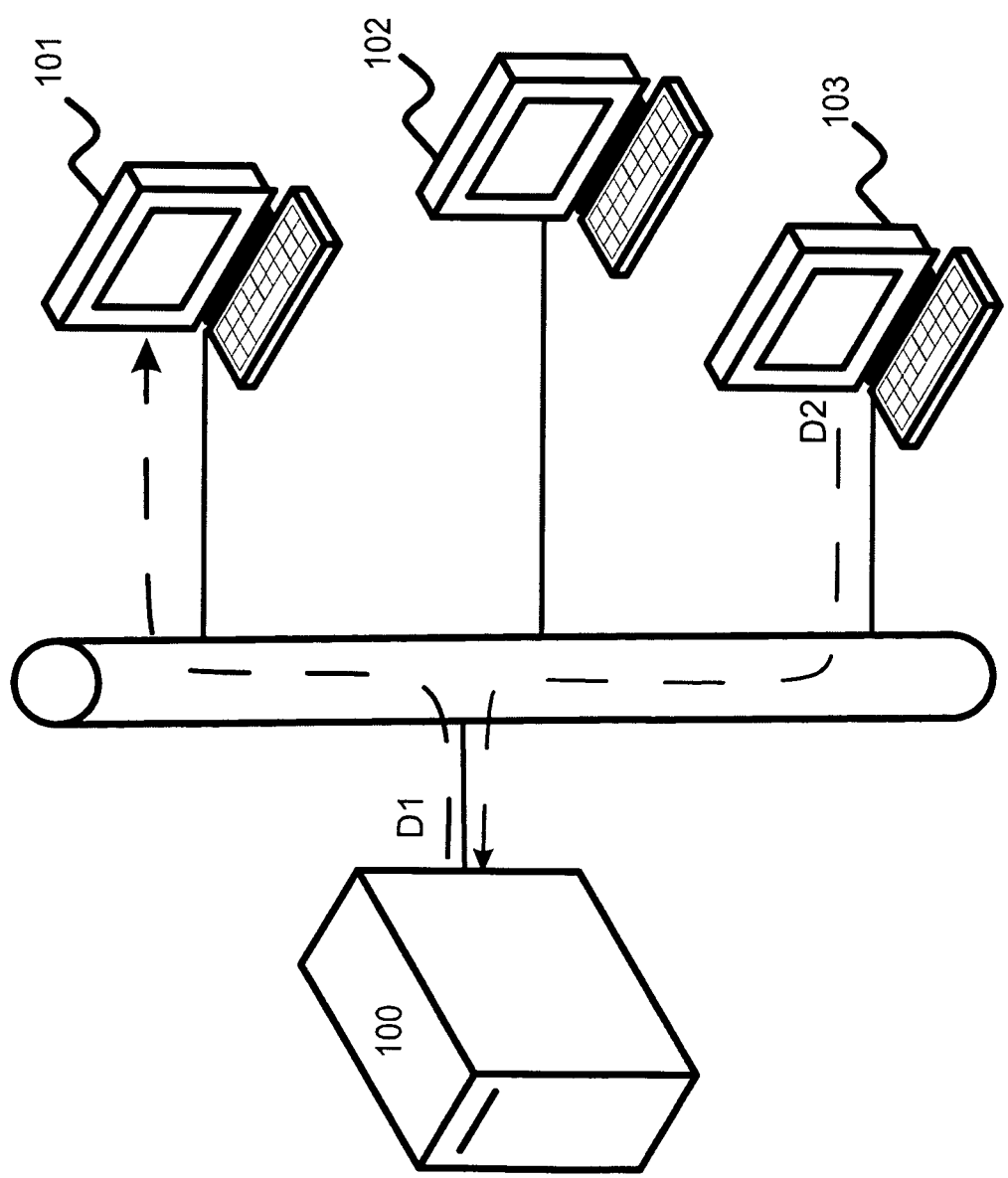
FIG. 1 shows a simplified example of a document management system.

An example of a file arrangement is illustrated in FIG. 1. This file arrangement is a document management system that comprises a document management server 100 and client devices 101, 102, 103, which are all interconnected. The interconnection can be wired or wireless and it may be substantially always on or it may be disconnected occasionally. The server 100 is configured to store objects (e.g. documents) that can be retrieved by the client devices 101, 102, 103. The server and client devices each typically includes at least one processor and at least one memory (computer readable medium) for storage of at least computer program code for execution by the at least one processor. The client device can be any electronic device capable of computing, such as e.g. a personal computer, a laptop, a mobile device.

As an example, in FIG. 1 document D1 is retrieved by client device 101, whereas document D2 is stored by the client device 103 to the document management server 100. The document management server 100 is configured mainly to store documents, but in use the document management server may have other functions as well, e.g. it controls access rights, registers modifications made to documents and allows connections to other systems. In FIG. 1, there are one server. However, in some cases, the computer system may comprise more than one server where the document management system is divided. An electronic document stored in the document management system is an example of an object. Such an object is given metadata items (i.e. property values) e.g. a name of creator, a type of a document, a project which the document belongs to, a security class, a client etc.

As was mentioned, the document management system can be dynamic so that the folders are virtual, and the documents are virtually located in the folders depending on the user's viewpoint that builds on top of metadata. The present solution can however be utilized in a file management system statically storing folders that comprises files. Documents can have more than one location in the dynamic document management system but the document as such is the same document throughout the locations. In other words, the document is stored into the document management system only once, but is given multiple locations based on its metadata items. Therefore, term "location" should be interpreted both physical and virtual location depending on the file arrangement to cover both dynamic document management system and file management system. However, in order to utilize the present solution, the objects (e.g. documents, folders) have to be associated with metadata. This means that each e.g. document has a property structure defining at least one piece of metadata (i.e. metadata item) for the document.

Figure 2:
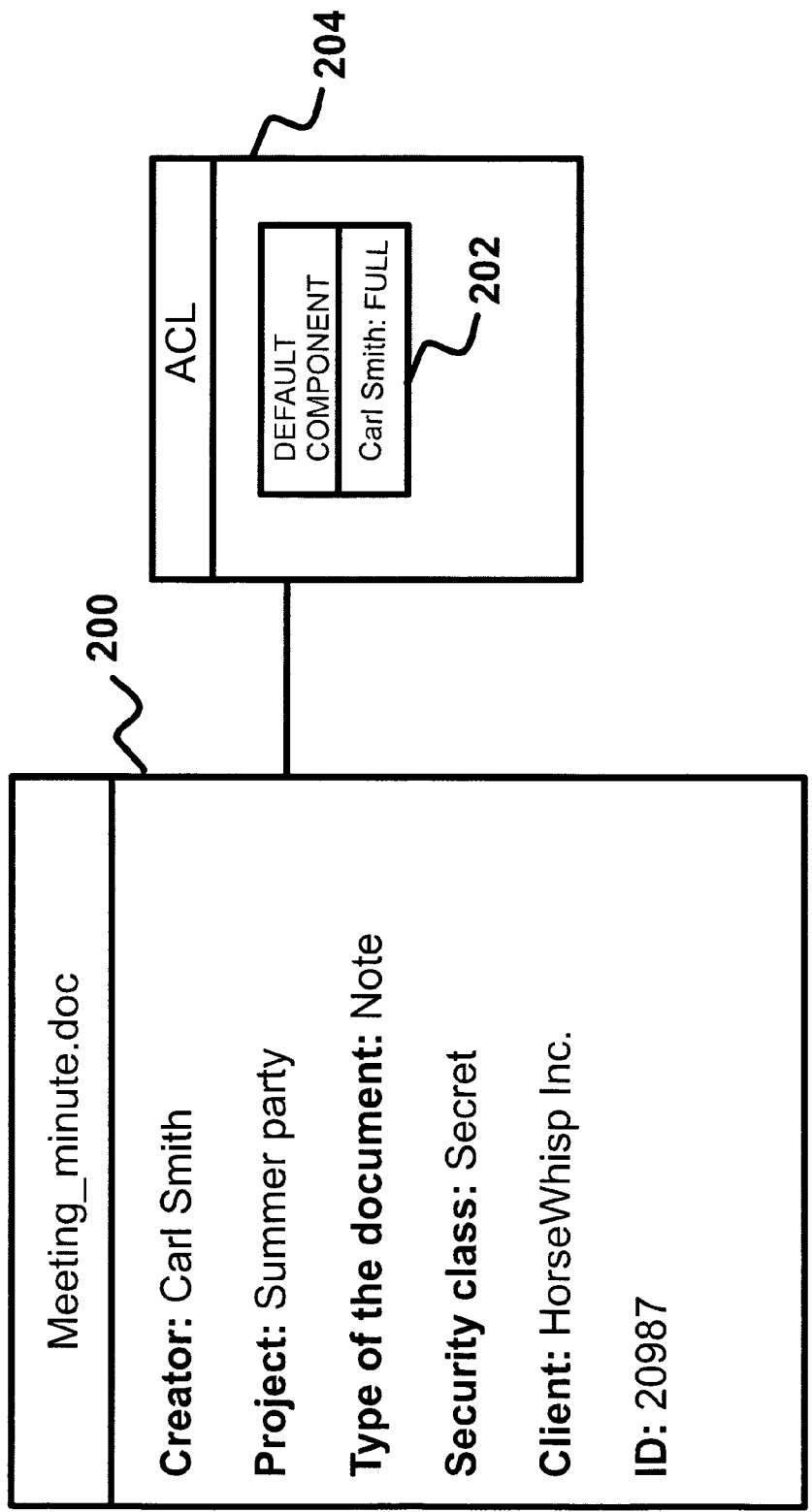
FIG. 2 shows an example of an object having metadata items and an ACL.

An example of an object comprising metadata items is illustrated in FIG. 2. In here, the object is a document "Meeting_minutes.doc" created by Carl Smith acting as a secretary of the meeting for project "Summer party". The project manager for this project is Holly Quinn (not shown in FIG. 2). It is realized that the object's metadata 200 comprises metadata items for the object, which metadata items define a creator, a project, a type of document, a security class, a client and an id number for the document. Each of these metadata items can be typed (or input by any known method) or selected from a predetermined list of values.

It can be seen that the object 200 refers to an ACL 204 that comprises a default component 202 allocating full access right to Carl Smith. It is appreciated that the ACL can be associated with the object by other means also, e.g. by inclusion, by linking, by direct reference, by indirect reference, etc.

Dynamic Metadata-Driven Access Control Lists

Figure 3A:
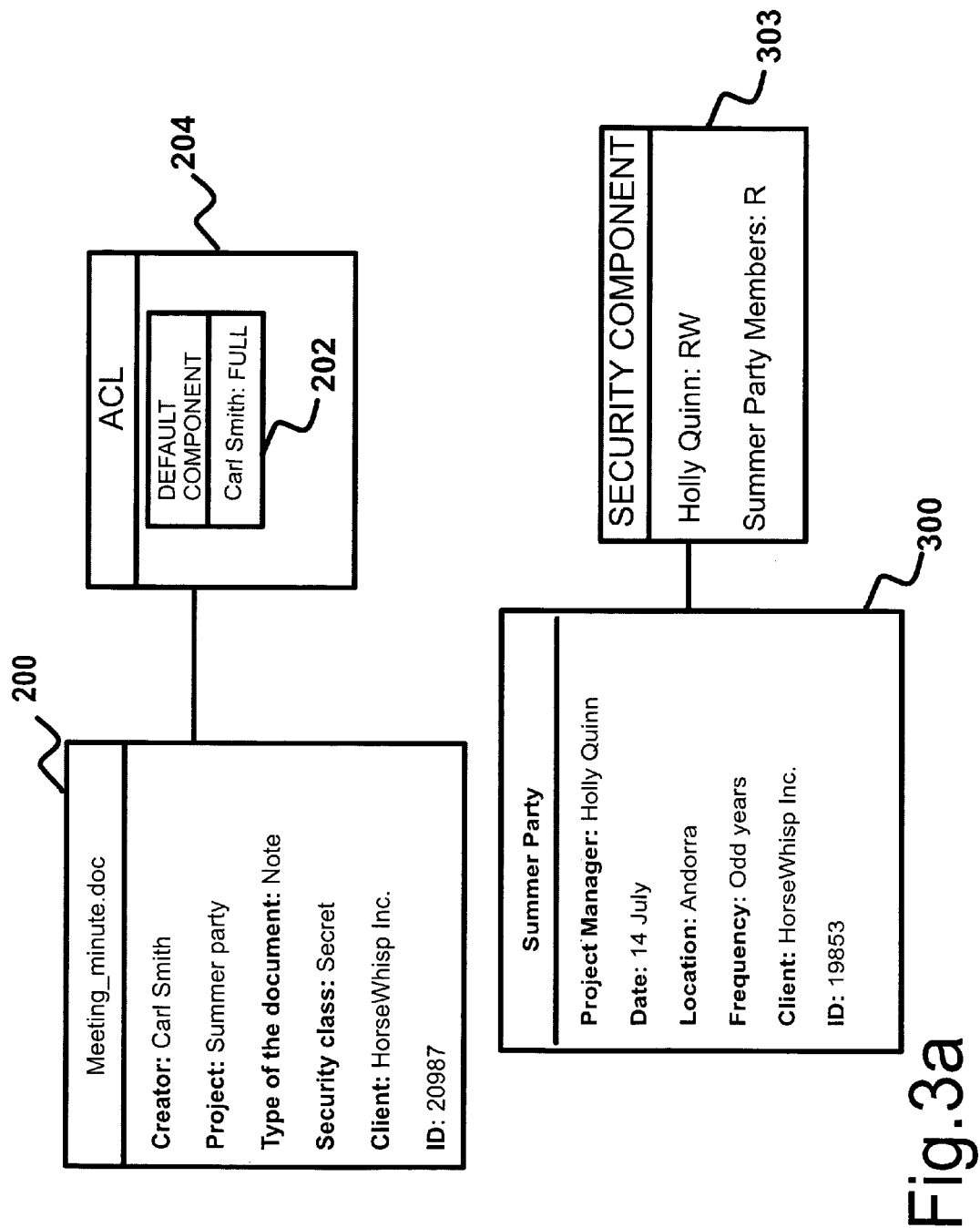
FIGS. 3a, 3b show an example for defining ACL for the object of FIG. 2.

Let us turn to FIG. 3a where "Meeting_minute.doc" shown in FIG. 2 is used as an example. In FIG. 3a an object comprising metadata items 300 for project "Summer Party" is illustrated. The "Summer Party" project comprises a metadata item for a project manager the value of which is Holly Quinn. Other metadata items define that the party is held on July, 14 in Andorra every odd year. The client of the project is HorseWhisp Inc. It is realized that the project refers to a security component 303 that defines access rights so that read-write-access ("RW") is allocated to Holly Quinn and read-access ("R") is allocated to Summer Party Members. It is appreciated that the security component can be associated with the object (e.g. project) by other means also, e.g. by inclusion, by linking, by direct reference, by indirect reference, etc.

Figure 3B:
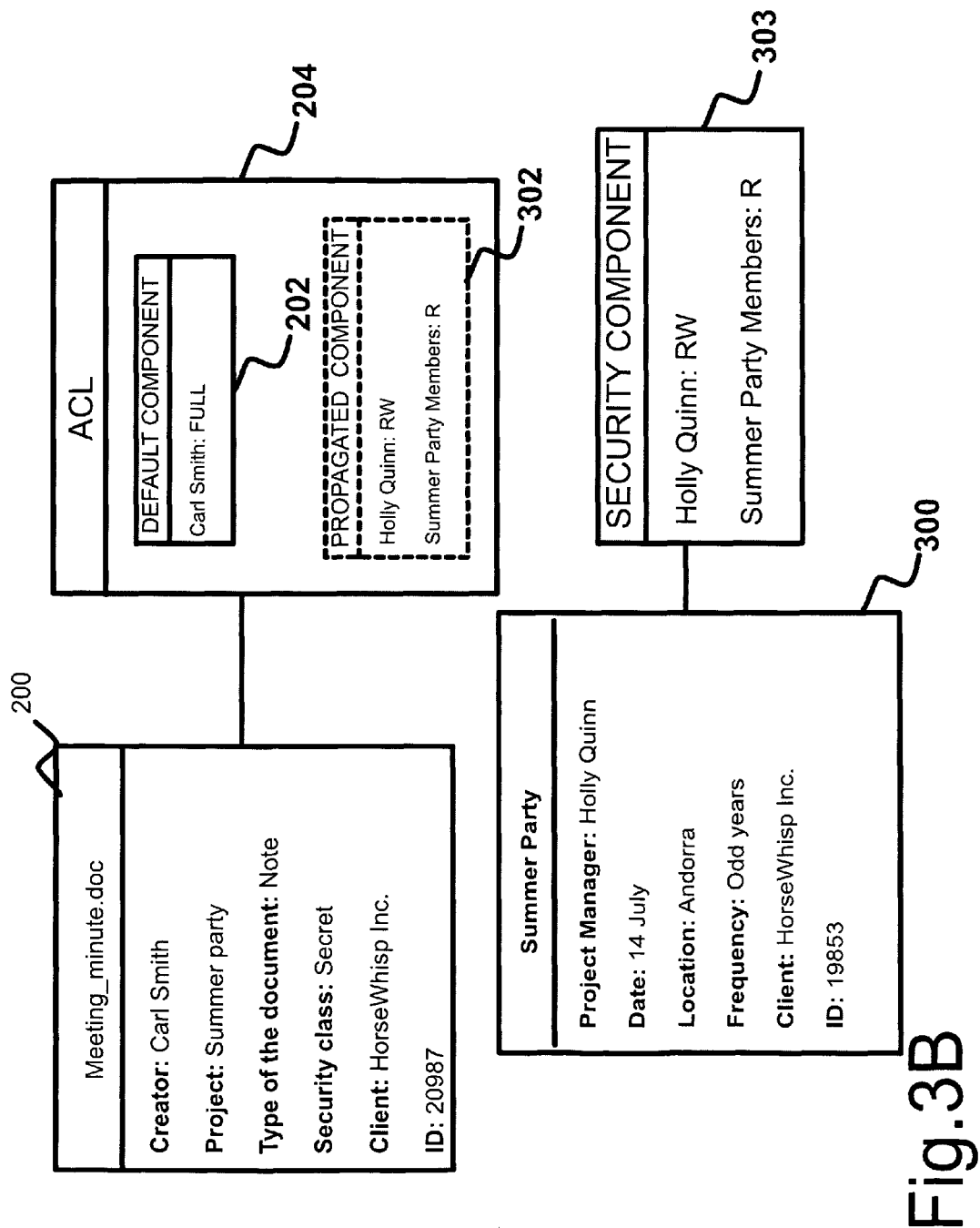

According to the present solution, this security component 303 of "Summer party" project defines rights to access any object referring to the "Summer Party" project (i.e. any object having a metadata item defining "Summer Party"), including "Meeting_minute.doc". Therefore, Holly Quinn can read and write "Meeting_minute.doc" and participants of the project "Summer party" can read "Meeting_minute.doc". The access rights originating from a security component of the object's metadata item can be called "propagatable permissions/access rights" because they propagate to the object's own ACL, as shown in FIG. 3b. The object "Meeting_minute.doc" has a property "Project", the value of which is "Summer party". The "Summer party" project refers to a security component 303 that defines access to objects referring to the said project. Therefore, the ACL 204 of object 200 is fulfilled with the content of the security component 303. As a result of this, the ACL 204 of the object 200 comprises its own default component 202 allocating full access right to Carl Smith and the propagated component 302 allocating read-write access right to Holly Quinn and read access right to Summer Party Members. It is appreciated that this security component is kind of a viral component that can be spread among the objects of the document management system as long as those objects refer to metadata items that further refers to (or is associated by other way to) a security component. It is also appreciated that propagation can be physical or virtual. The difference between these is that in physical propagation the security component is physically copied or transmitted to the ACL of the object before actually evaluating the access rights. On the other hand, in virtual propagation, the security component is dynamically incorporated from the metadata item while the object ACL is being evaluated.

Figure 4A:
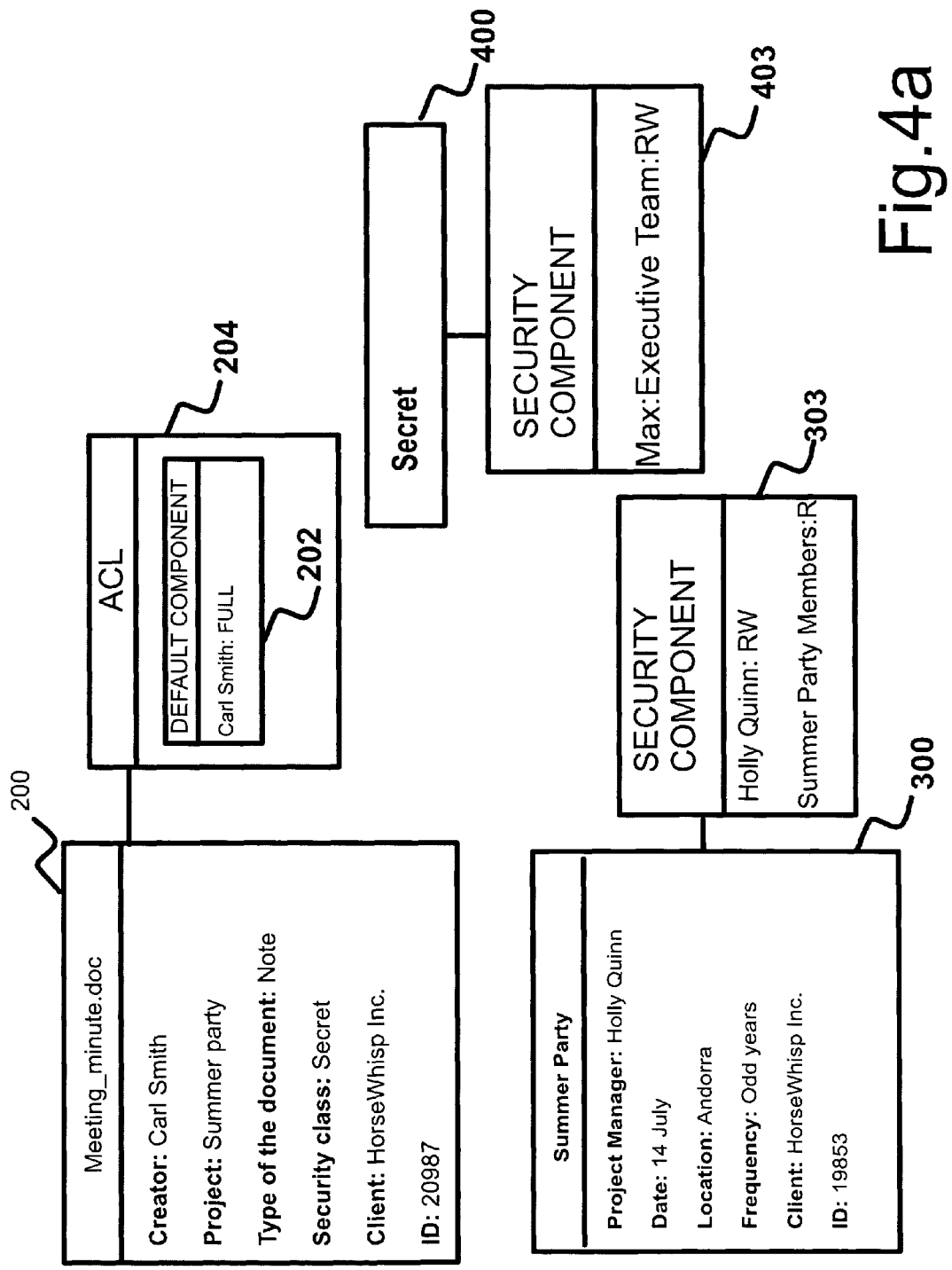
FIGS. 4a, 4b show an example for defining ACL for the object of FIG. 2 by means of two security components.

FIG. 4a illustrates the same example as shown in FIGS. 2 and 3, but provides more information for "Meeting_minute.doc". In FIG. 4a, an object "Secret" 400 refers to a security component 403 that gives RW rights to an executive team at the most. Because "Meeting_minute.doc" has a property value "Secret", this security class object 400 further defines access rights to the document "Meeting_minute.doc". It is realized (see FIG. 4b) that now "Meeting_minute.doc" has an ACL 204 that is defined by object's own default component 202 and by two propagated components: one 302 allocating "RW" to Holly Quinn and "R" to Summer Party Members; and the other 402 allocating RW rights to executive team at the most. The resulted effective access rights for the object can be determined according to predetermined rules comprising instructions on how separate components are disposed to each others.

It is to be noticed in this example that any object having a reference to the "Summer party" metadata item can have the access rights according to the security component of that particular project. Similarly, any object having a reference to the "Secret" metadata item can have the access rights according to the security component of that particular security class. However, additionally it is possible to configure by which properties, security components can be propagated to the object's ACL. For example, a project metadata item might be referred by several properties, such as "Customer Project" and "Project for Tracking Purposes", but only the "Customer Project" property would be configured to enable propagation.

By the first solution, the access right determination propagates easily throughout the document management system when the originating security component is modified. However, the resulted ACL for the object can be also modified by the user if the propagated components allow the user to do so. For instance, the security component of the "Secret" metadata item might be configured to reject any modification because of its dominantly confidential nature.

As mentioned earlier, the effective access rights can be determined according to predetermined rules. For example, in FIGS. 4a, 4b, the effective access rights for the document in question can be determined as a partial intersection of the three components within the ACL 204. This means that RW access rights are appointed to Carl Smith or Holly Quinn only if they are also members of the executive team. In such a case, the full control being allocated to Carl Smith is reduced to RW, because the security component of "Secret" defines the maximum rights. Similarly, such Summer Party Members who are also members of Executive Team are given permissions for the object. However, in such a case, the R permission of such Summer Party Members is not broadened to RW. It is worth mentioning that in some cases "Max:Executive Team" may choose not to indicate any particular access rights. In such a situation, the access rights of persons are preserved from other security components, but the maximum set of effective persons are determined according to their membership in the Executive Team.

In some cases, the effective access rights can be formed by combining each propagated component being referred whereby each propagated component supplements the complete access rights of the object as in example of FIGS. 3a, 3b. It is appreciated that any security component can restrict, supplement, override or define the maximum or the minimum restriction for the other security components or determined according to any combination of those. The nature of the security component depends on the use case and can be specified separately.

Figure 4B:
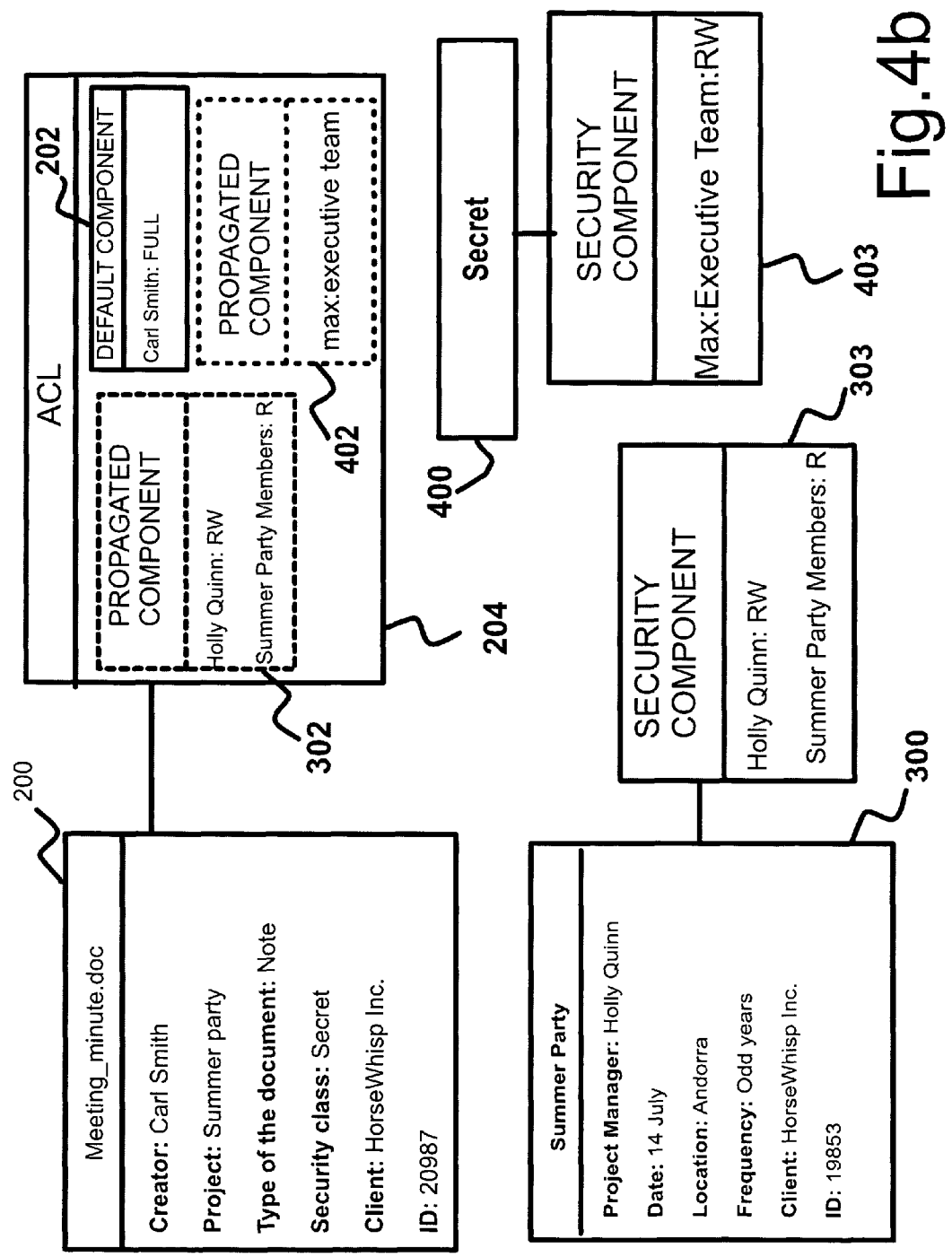

In the example shown in FIGS. 4a, 4b, there are two security components that define the access rights for the document. However, there could be yet more security components for one object. Each security component has its own determining factor. For example, it is possible to set the security component of the security class "Secret" as the dominant security component, which always restricts the other components. On the other hand, it is possible to refer to a metadata item called "note" that has a security component "min:Everyone:R". This may override other security components and give everyone a read access. To overcome any conflict occurring between components, the system may comprise an ACL conflict management policy that can be configured to set priorities to the security components.

In addition, it is possible to use any security component originating via indirect metadata item references across several objects. This means that the metadata item of the object does not include any security component by itself but comprises a metadata item that either refers to a security component or comprises yet another metadata item including a security component. Basically, such a chain of security components can be as long as security components can be found along the path across cascaded objects.

The idea behind this first solution of the invention is to retrieve security components based on the metadata of the object, and to combine them to automatically define the access rights for the object. However, as was mentioned earlier, sometimes the user may desire to set or modify the resulted access rights of the object manually. In such a simple case, the manually set access rights affect only the object in question and do not propagate any further. On the other hand, if the user wishes to change the content of the security component of e.g. the project, then the ACL of any object referring to that project can be automatically updated accordingly. This automatic update can occur immediately after the security component has been changed, or after a certain time period. In some cases, the automatic update may also be ignored.

In this solution the access right settings do not depend on the physical location of the object in the document management system, as in the solutions of related art, but on the ACL composed from security components derived by the means of the metadata of the object. This ACL can then be included in the object's metadata on object level and/or version-specifically.

Metadata-Driven Access Role Assignment

Figure 5:
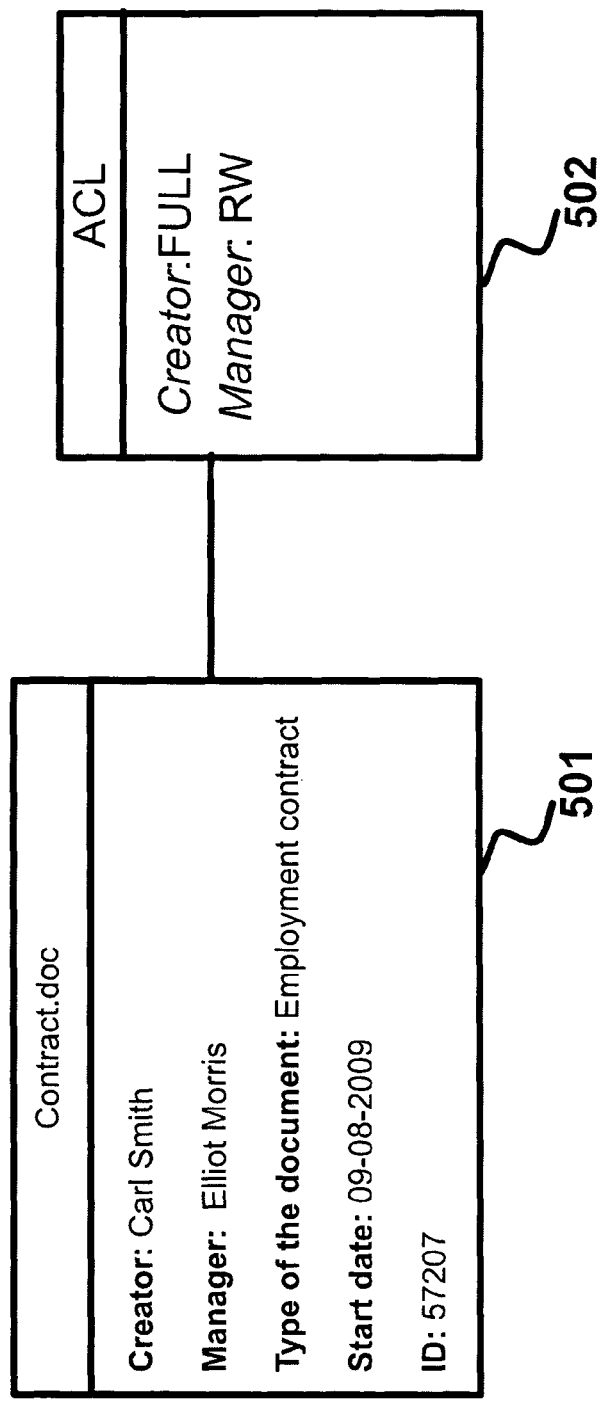
FIG. 5 shows another example of an object having metadata items and an ACL.

FIG. 5 illustrates an example of the present solution from another point of view. It is realized that the content of FIG. 5 resembles the content of FIG. 2. However, what is different is that the ACL 502 of object 501 allocates access rights to pseudo-users—"Creator", "Manager"—instead of person identities. The term "pseudo-user" is an attribute that refers to a metadata item representing a user or a user group. This attribute is called "pseudo-user" as long as the user item lacks a value. It can be easily recognized that this kind of solution makes it possible to define ACL even though the object would not have any value for the metadata items in question. For example, Carl Smith will receive full rights at the moment "Carl Smith" is given as a value to "Creator" metadata item. Similarly, Elliot Morris will receive RW access rights at the moment "Elliot Morris" is given as a value to "Manager" metadata item. Because of the present solution, modifications of the values for "Creator" and "Manager" can be automatically resolved into the object's ACL without requiring the user to directly modify the effective access rights in the ACL. If Holly Quinn would take the place of Elliot Morris, the user only has to define "Holly Quinn" as the value of "Manager", and RW rights would automatically be appointed to Holly Quinn.

Figure 6A:
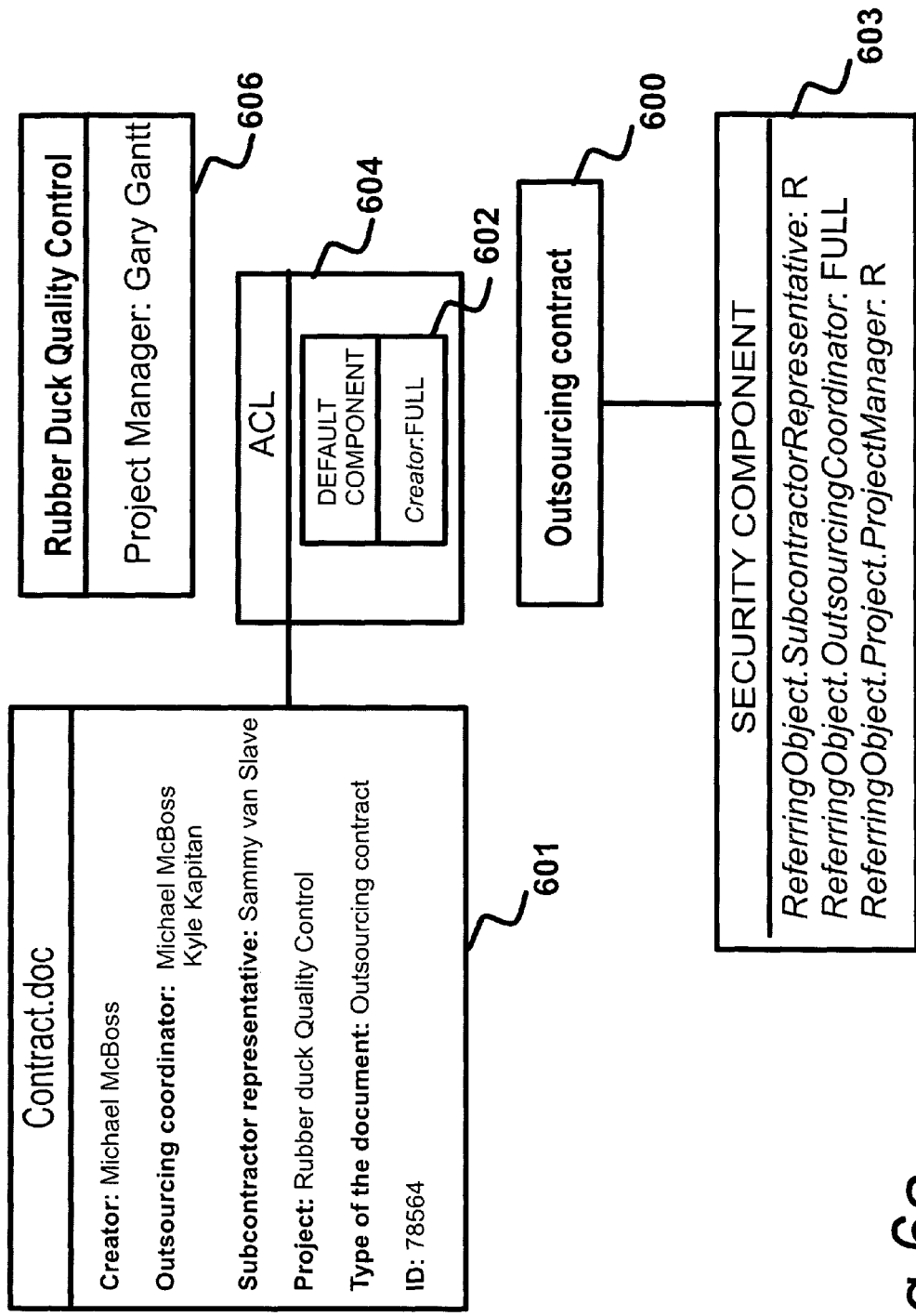
FIG. 6a shows yet further example for defining ACL for an object.

FIG. 6a illustrates how the solution of FIG. 5 can be utilized by the first solution (shown in FIGS. 2-4). In this example, a security component 603 is created. This security component allocates access rights to the pseudo-users e.g. according to notation "ReferringObjectRole:AccessRight". In FIG. 6a the security component 603 defines "ReferringObject.SubcontractorRepresentative:R" refers to a metadata item "subcontractror representative" of the referring (target) document; "ReferringObject.OutsourcingCoordinator: FULL" refers to a metadata item "outsourcing coordinator" of the referring (target) document; and "ReferringObject.Project.ProjectManager:R" refers to a metadata item "project" of the referring (target) document. This security component 603 is related to the outsourcing contract object 600 that defines type for documents.

Now, Michael McBoss creates a new document "contract.doc" 601 comprising metadata items. One of the metadata items defines that the type of the document is an "Outsourcing Contract". Also, the document "contract.doc" refers to a project "Rubber Duck Quality Control" 606 having Gary Gantt as its project manager. Michael McBoss sets further metadata items to the document, e.g. Subcontractor Representative is Sammy van Slave and Outsourcing coordinators are Michael McBoss and Kyle Kapitan. It is to be noticed that the object 601 also comprises an ACL 604 having a default component, where—according to the second solution—a pseudo-user "Creator" receives full rights.

At the time the metadata items of "contract.doc" have values for outsourcing coordinator and subcontractor representative, the access rights will be emerged. It is to be noticed that the security component 603 may have been created before the object "Contract.doc". Therefore it does not have to pay any attention to identities of persons but it can exist independently. At the time the security component 603 is propagated to any object, it will affect to the access rights of any object whose metadata items can be used in resolving the pseudo-user references.

Figure 6B:
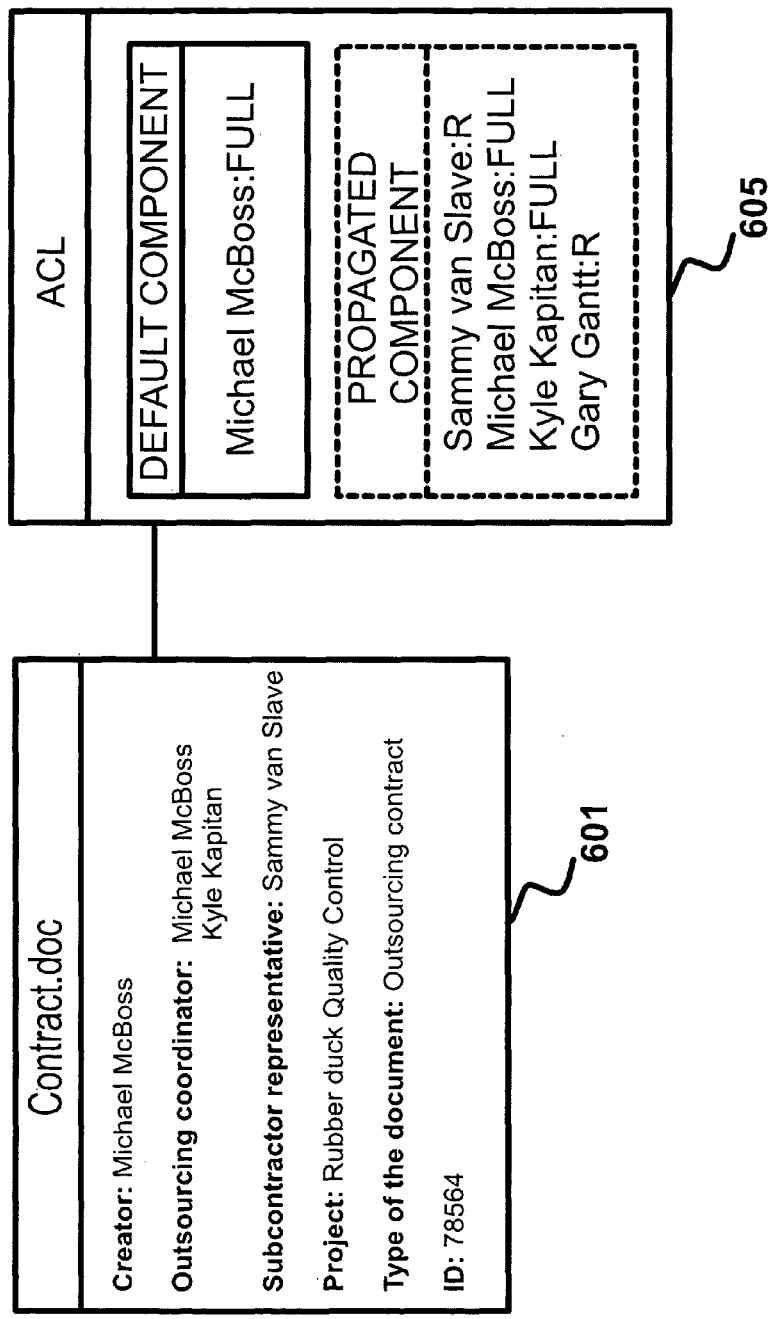

FIG. 6b now shows the resolved access rights 605 for object 601. As a result of the propagation, Sammy van Slave gets read permission, Michael McBoss gets full rights, Kyle Kapitan also gets full rights and Gary Gantt gets read permission. In practice, the resolving can be performed physically, as shown in FIG. 6b, or dynamically (virtually), or by mixing these two extremes.

The flexibility of the second solution can be realized from FIGS. 6a and 6b. For example, when the project manager changes because Gary Gantt is leaving the company, and Flo C. Hart takes over as Project Manager of Rubber Duck Quality Control, the change is automatically propagated to the "contract.doc", and therefore read access is automatically given to Flo C. Hart instead of Gary Gantt.

IN CONCLUSION

In the previous, two types of solutions for metadata-based security model have been disclosed.

In the first solution, the access rights for an object are derived from referred metadata items that further refers to a security component comprising information on access rights. In the second solution, the access rights are derived from pseudo-users. The second solution can also be utilized in the first solution, so that the security component comprises notation for pseudo-users and their access rights.

In previous, the solutions contain examples where either the security component or the pseudo-user is one step apart from the referring object. However, it possible to have more than one metadata reference levels between the security component and the referring object and/or more than one metadata reference levels between the security component and the pseudo-user.

The various embodiments of the invention can be implemented with the help of computer program code that resides in a memory and causes the relevant apparatuses, such as the server and the client device, to carry out the invention. These solutions can be performed in one device only or it can be divided depending on how much data is stored in the client device. In addition, the devices and the system can comprise other devices and operations that enhance their performance. For example, human-machine-interaction can be configured to any stage of the solution, when appropriate. It is obvious that the present invention is not limited solely to the above-presented embodiments, but it can be modified within the scope of the appended claims.

What is claimed is:

1. A method for a computer system storing electronic objects being defined by metadata comprising one or more properties having values, comprising:
   determining access rights for an object by means of one or more pseudo-users, wherein a pseudo-user indicates a metadata property of an object, from a value of which an identity of a user is retrievable;
   retrieving the identity of the user being allowed to access the object by a metadata property value of another object that is indirectly referred to from a metadata property value of the object being accessed, wherein said identity of the user is located in a metadata property value of a last object in a chain of cascaded objects, wherein said chain of cascaded objects is automatically generated by metadata value references between the object being accessed and the last object.

2. The method according to claim 1, further comprising retrieving said access rights from at least one security component being referred by a metadata property value of the object.

3. The method according to claim 2, wherein an object refers to the object's own access control list, wherein the effective access rights for the said object are determined by means of security components as part of the object's own access control list.

4. The method according to claim 1, wherein the user belongs to a user group, which is defined by a pseudo-user.

5. A non-transitory computer readable medium comprising computer program instructions stored thereon, wherein said instructions, when executed, are for
   determining access rights for an object being defined by metadata comprising one or more properties having values by means of one or more pseudo-users, wherein a pseudo-user indicates a metadata property of an object, from a value of which an identity of a user is retrievable;
   retrieving the identity of the user being allowed to access the object by a metadata property value of another object that is indirectly referred to from a metadata property value of the object being accessed, wherein said identity of the user is located in a metadata property value of a last object in a chain of cascaded objects, wherein said chain of cascaded objects is automatically generated by metadata value references between the object being accessed and the last object.

6. An apparatus comprising a processor, memory including computer program code, the memory and the computer program code configured to, with the processor, cause the apparatus to perform at least the following:
   determine access rights for an object being defined by metadata comprising one or more properties having values by means of one or more pseudo-users, wherein a pseudo-user indicates a metadata property of an object, from a value of which an identity of a user is retrievable;
   retrieve the identity of the user being allowed to access the object by a metadata property value of another object that is indirectly referred to from a metadata property value of the object being accessed, wherein said identity of the user is located in a metadata property value of a last object in a chain of cascaded objects, wherein said chain of cascaded objects is automatically generated by metadata value references between the object being accessed and the last object.

7. A computer system comprising:
   at least one processor;
   at least one memory including computer program code;
   the memory and the computer program code configured to, with said at least one processor, cause the computer system at least to perform:
      determining access rights for an object being defined by metadata comprising one or more properties having values by means of one or more pseudo-users, wherein a pseudo-user indicates a metadata property of an object, from a value of which an identity of a user is retrievable;
      retrieving the identity of the user being allowed to access the object by a metadata property value of another object that is indirectly referred to from a metadata property value of the object being accessed, wherein said identity of the user is located in a metadata property value of a last object in a chain of cascaded objects, wherein said chain of cascaded objects is automatically generated by metadata value references between the object being accessed and the last object.

* * * * *